United States Patent

[11] 3,585,858

[72] Inventor Jay I. Black
 Orange, Conn.
[21] Appl. No. 880,527
[22] Filed Nov. 28, 1969
[45] Patented June 22, 1971
[73] Assignee Avco Corporation
 Stratford, Conn.

[54] SIGNAL ERROR COMPENSATED FLUIDIC OSCILLATOR TEMPERATURE SENSORS
 4 Claims, 3 Drawing Figs.
[52] U.S. Cl. .................................................. 73/339 A, 73/357
[51] Int. Cl. .................................................. G01k 11/22
[50] Field of Search .......................................... 73/339 A, 357

[56] References Cited
 UNITED STATES PATENTS
 3,403,509 10/1968 Eastman et al. .............. 73/339 X
 3,470,743 10/1969 Steinberg ..................... 73/339 (A)

Primary Examiner—Louis R. Prince
Assistant Examiner—Frederick Shoon
Attorneys—Charles M. Hogan and Gary M. Gron ABSTRACT: A pair of fluidic oscillators are placed back to back and their resonant cavities, which have different geometry constants, are separated by a relatively thin sheet of high thermal conductivity material. The cavities have a mutual inlet from which a supply of the gas, whose temperature is to be measured, enters the oscillators. The flow of gas through the oscillators causes the pressure in the chambers to oscillate at different resonant frequencies. The frequencies are measured by suitable transducers and the output of the transducers fed to circuitry which produces a signal output representing the difference in frequency between the two cavities. The relatively thin sheet causes the cavity temperatures to be identical. Therefore, the signal error caused by heat loss from the oscillators ambient is substantially compensated for.

PATENTED JUN22 1971

3,585,858

INVENTOR.
JAY I. BLACK

BY Charles M. Hogan
Gary M. Gron
ATTORNEYS.

SIGNAL ERROR COMPENSATED FLUIDIC OSCILLATOR TEMPERATURE SENSORS

The present invention relates to fluidic oscillators and more particularly to oscillators of this type that are used for temperature measurement.

In recent years the fluidic oscillator has been used increasingly for temperature measurements. Briefly, an oscillator for this purpose comprises a resonant chamber having inlet and outlet orifices. The inlet orifice is connected to the gas to be measured and the outlet orifice is connected to a low pressure discharge so that a flow of the fluid whose temperature is to be measured passes through the chamber. A splitter, positioned in the chamber, causes the flow to set up a series of pressure oscillation at a given frequency. This frequency is proportional to the fixed geometry constant of the chamber and the absolute temperature of the gas in the chamber.

One of the problems in using oscillators of this type for temperature measurement is that the temperature between the inlet to the oscillator and the chamber is not identical. This variation is caused by heat loss from the oscillator to the ambient temperature surrounding the oscillator. If the oscillator is used for steady-state temperature measurement and is immersed in the fluid whose temperature is to be measured, this problem is minimized. However, in environments where the fluid whose temperature is to be measured has rapidly changing temperature variations, the error becomes quite substantial.

Accordingly, it is an object of the present invention to provide a fluidic temperature sensor of the above type which substantially eliminates errors in the output signal when the sensor is used to measure the temperature of a gas whose temperature varies rapidly.

In one aspect of the invention the above ends are achieved by providing a pair of fluidic oscillators of the above general type in a back-to-back relationship. The cavities of the oscillators are separated by a relatively thin sheet of high thermal conductivity material. The chambers are fed by a common supply conduit. As a result, the error produced by variations between the chamber temperatures and the supply conduit temperature is substantially eliminated.

The above and other related objects and features of the present invention will be apparent from a reading of the description thereof pointed out in the appended claims.

Figure 1:
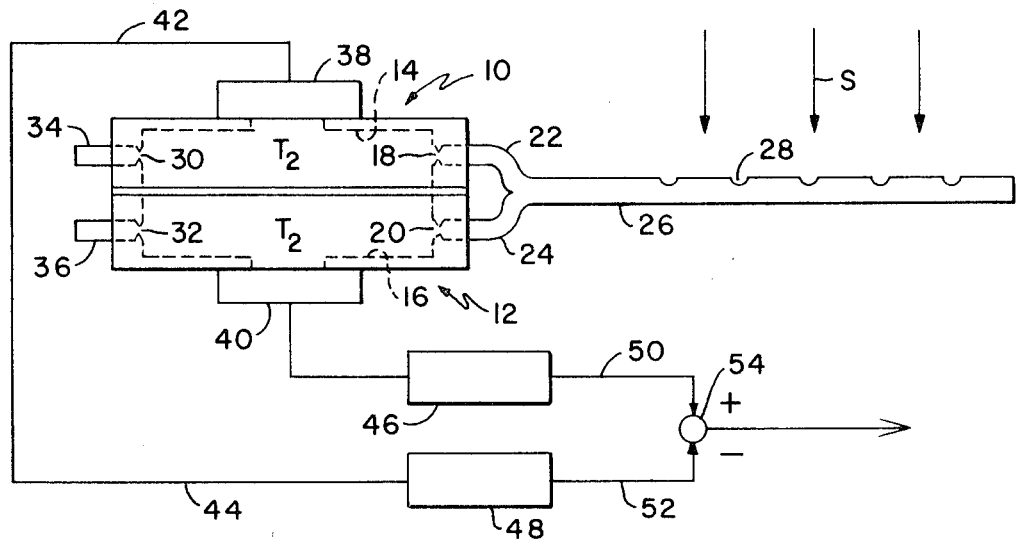
FIG. 1 is a schematic illustration of a fluidic temperature sensor embodying the present invention.

Referring particularly to FIG. 1, there is illustrated a pair of back-to-back fluidic oscillators, generally indicated by reference characters 10 and 12. The oscillators 10 and 12 have resonant chambers 14 and 16 separated by a relatively thin sheet 15 of material having a high termal conductivity which forms a common wall between the chambers. Chambers 14 and 16 have different geometry constants to produce differing variations of frequency for the same variation in temperature as is well known in the art. The chambers 14 and 16 have inlet orifices 18 and 20, respectively, receiving flow from the Y-shaped branches 22 and 24 of a common supply conduit 26. The supply conduit 26 may be elongated and have a plurality of ports 28, each of which receives flow from a fluid stream represented by arrows S. The chambers 14 and 16 have outlet orifices 30 and 32, respectively, which discharge through conduits 34 and 36 into a discharge which is at a lower pressure level than the level of the fluid stream whose temperature is to be measured.

The pressure differential across the fluidic oscillators 10 and 12 causes a flow of fluid therethrough and splitters (not shown) cause pressure oscillations of the fluid in the chambers 14 and 16. The frequency of these pressure oscillations are sensed by transducers 38 and 40. Many types of transducers may be employed for this purpose. However, it has been found that transducers converting the pressure oscillations into electrical frequency output have been quite useful. The frequency output from the transducers 38 and 40 is fed via lines 42 and 44 to converters 46 and 48. Converters 46 and 48 convert the frequency input to an analog output, such as a DC voltage directly proportional to the frequency in the chambers 14 and 16. The DC signal from converters 46 and 48 is fed via lines 50 and 52 to a summing device 54 which produces an output signal directly proportional to the difference in the frequency between chambers 14 and 16.

Figure 2:
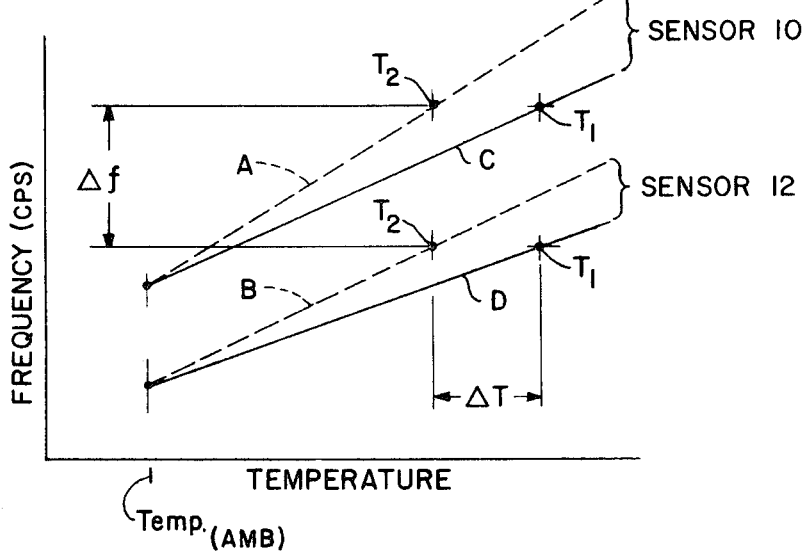
FIGS. 2 and 3 are curves illustrating the frequency of the pressure oscillations in the chambers of the oscillator of FIG. 1 as a 2 of temperature.

As stated previously, the flow through the oscillators 10 and 12 causes them to oscillate at frequencies which are dependent upon the temperature in the chambers 14 and 16. Referring to FIG. 2, the frequency of oscillation is functionally related to the temperature $T_2$ in chambers 14 and 16 by curves A and B, respectively. It is seen that an increase infrequency is caused by an increase in the temperature in chambers 14 and 16. Curves C and D, however, indicate the relationship between frequency and temperature $T_1$ in the inlet conduit 26 for the oscillator assembly.

It is apparent that these curves related temperature to frequency by different constants. Therefore, the frequency of the individual chambers in response to given temperature levels at the inlet is different from the frequency response in the chamber. This produces errors in the measurement when the gas entering through the inlet conduit 26 has a dynamically changing temperature.

Figure 3:
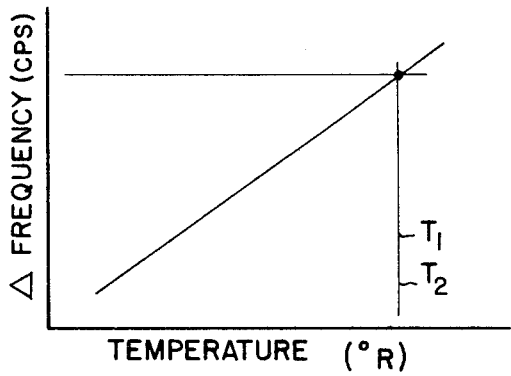

However, since the oscillators 10 and 12 are separated only by the relatively thin sheet 15 of high termal conductivity material, temperatures $T_2$ are identical since there is substantially no temperature gradient between the chambers. In addition, temperatures $T_1$ are identical because they are fed through a common supply. The temperature gradient of the two chambers between their inlets and resonant chambers are therefore maintained equal. The difference in their frequency response $\Delta F$ is solely dependent upon the temperature of the inlet in conduit 26. This result is arrived at because the measurement of the difference in frequency between the two chambers 14 and 16 cancels out the heat loss of the respective chambers to the ambient temperature. The net effect of the above relationships is a calibration curve for the total oscillator, as shown in FIG. 3, wherein the $\Delta$ frequency is directly proportional to the temperature of the gas in the inlet conduit 26. This feature enables the oscillator to achieve highly accurate results in measuring gases with dynamically changing temperatures.

The oscillator may also be used with the elongated tube 26 and the plurality of ports 28 to measure an average temperature across a hot gas stream represented by arrows S. In this case the gas stream at various positions in the stream enters individual ports 28 and passes to the oscillators 10 and 12 through conduit 26. Each of the individual flows from ports 28 gives up or receives heat energy from adjacent ports 28 so that in the outlet end of tube 26 the temperature of the mixture of the flows is an average of the flow from individual ports 28 and thus an average of the temperature across the stream.

The present invention may also be used in remote sensing of a temperature by utilizing a pair of tubes which extend from the oscillators 10 and 12 to the remote gas whose temperature is to be measured. As long as the tubes are subjected to the same ambient conditions, the oscillators may be readily calibrated to compensate for the heat losses through the pipes. However, the heat loss of the oscillator itself to the ambient is substantially compensated for and permits oscillator cooling with a constant temperature. Furthermore, it eliminates from the transient response of the oscillator that portion of the response due to heating and cooling the large mass of material making up the walls of the oscillator. This leaves only the response, due to purging the resonant chambers 14 and 16 which is most desirable.

The above discussion is based on an ambient temperature surrounding the oscillator which has little, if any, variation. In order to minimize the effects of variations in this ambient the oscillators 10 and 12 are preferably constructed of low thermal conductivity material except for the relatively thin sheet 15 which separates the chambers 14 and 16. This insures that the heat loss of the oscillators to the ambient is minimized and while still maintaining the chamber temperatures substantially equal.

It will be apparent to those skilled in the art that the invention may be constructed otherwise than as shown without departing from the spirit of the present invention. Accordingly its scope is to be determined solely by the appended claims.

Having thus described the invention, what I claim as novel and desired to be secured by Letters Patent of the United States is:

1. A fluid temperature sensor comprising:
    a pair of fluidic oscillators having resonant chambers with different geometry constants and being placed back to back;
    a thin high termal conductivity sheet positioned between said resonant chambers and forming a common wall therebetween to equalize the temperatures therein;
    common conduit means for connecting a supply of fluid whose temperature is to be measured to each of said chambers,
    means for providing a low pressure discharge from each of said chambers;
    means for sensing the pressure oscillations in said chambers and providing a single output proportional to the difference n the frequency oscillations of the oscillators.

2. A fluidic temperature sensor as in claim 1 wherein said chambers signal low thermal conductivity walls except in the common sheet therebetween.

3. A fluidic temperature sensor as in claim 1 wherein said conduit means includes an elongated portion having spaced inlets adapted to be positioned across a fluid stream whereby the temperature sensed is an average temperature of said stream.

4. A fluidic temperature sensor as in claim 3 wherein said sensing means comprises:
    transducers connected to each of said chambers for providing an electrical output signals proportional to the pressure oscillations in said chambers;
    means receiving the output of transducers for generating an analog DC voltage proportional to the frequency of the transducer signals;
    means receiving the output of said analog means for generating a signal proportional to the difference in the frequency of pressure oscillations of said transducers.

PO-1050
(5/69)

UNITED STATES PATENT OFFICE
CERTIFICATE OF CORRECTION

Patent No. 3,585,858      Dated June 22, 1971

Inventor(s) JAY I. BLACK

It is certified that error appears in the above-identified patent and that said Letters Patent are hereby corrected as shown below:

Col. 1, line 51, "as a 2 of temperature" should read
-- as a function of temperature -- .

Col. 2, line 17, "infrequency" should read -- in frequency -- ;
line 31, "termal" should read -- thermal -- .

Col. 3, line 19, "termal" should read -- thermal -- .

Col. 4, line 3, "single" should read -- signal -- ;
line 4, "n" should read -- in -- ;
line 6, "chambers signal low thermal conductivity walls except in the" should read
-- chambers have low thermal conductivity walls except for the -- .

Signed and sealed this 21st day of December 1971.

(SEAL)
Attest:

EDWARD M. FLETCHER, JR.
Attesting Officer

ROBERT GOTTSCHALK
Acting Commissioner of Patents